J. J. MOORE.
BIT FOR MINING MACHINES.
APPLICATION FILED NOV. 15, 1912.
1,081,131.
Patented Dec. 9, 1913.
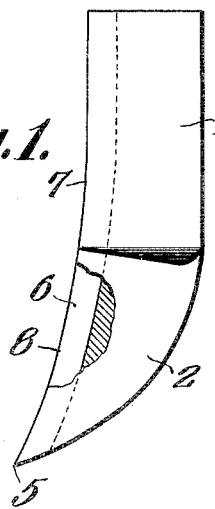
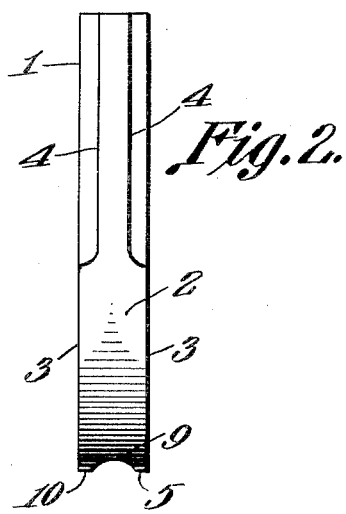
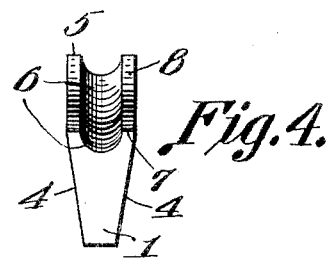
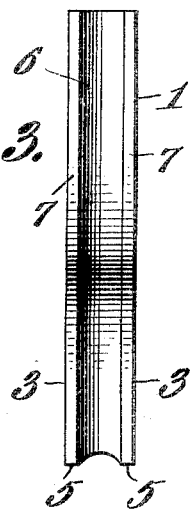
Justus J. Moore,
Inventor
by C. A. Snow & Co.
Attorneys
Witnesses

UNITED STATES PATENT OFFICE.

JUSTUS J. MOORE, OF SPRINGFIELD, ILLINOIS, ASSIGNOR OF ONE-THIRD TO W. A. BREWERTON, OF CHICAGO, ILLINOIS, AND ONE-THIRD TO HARRY THOMAS, OF HARRISBURG, ILLINOIS.

BIT FOR MINING-MACHINES.

1,081,131.      Specification of Letters Patent.      Patented Dec. 9, 1913.

Application filed November 15, 1912. Serial No. 731,613.

*To all whom it may concern:*

Be it known that I, JUSTUS J. MOORE, a citizen of the United States, residing at Springfield, in the county of Sangamon and State of Illinois, have invented a new and useful Bit for Mining-Machines, of which the following is a specification.

This invention relates to bits for use in connection with mining machines, its object being to provide a bit of this character having a cutting edge so shaped that, as the edge wears down, the corners or ends thereof will not become rounded but will remain substantially square so as thus to maintain constant the efficiency of the tool.

Another object is to provide a tool of this character which, by reason of the peculiar contour of its cutting edge, will more easily cut into the coal and reduce to the minimum the production of dust which is practically a worthless product.

A further object is to provide a tool of this type which is self-sharpening and which is adapted for use in connection with any of the well known types of chains now in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of the bit. Fig. 2 is a rear elevation thereof. Fig. 3 is a front elevation. Fig. 4 is a plan view of the upper end thereof. Fig. 5 is a bottom plan view.

Referring to the figures by characters of reference 1 designates the shank portion of the bit, this shank portion merging at one end into a forwardly curved cutting portion 2. This cutting portion is formed with parallel side faces, designated at 3, while the shank portion 1 has its side faces converging rearwardly as shown at 4. It will be seen that the cutting portion 2 terminates in an edge 5 which is intersected by one end of a channel 6. This channel extends longitudinally within the front face 7 of the shank 1 and within the front face 8 of the cutting portion 2. The channel is preferably provided with a transversely concaved bottom and as it intersects the end of the cutting portion 2, it will be apparent that the cutting edge of the tool thus follows the curvature of the bottom of the channel, as shown at 9 and has its ends extended along a straight line, as shown at 10. The cutting edge thus produced in much longer than where a straight edge is provided from one side to the other of the bit and, as a result, the cutting action is much easier. Furthermore, as the active end of the bit wears down, the cutting edge will be maintained sharp and, as those portions of the bit adjacent the ends of the cutting edge are thicker than the adjacent channeled portion of the bit, it will be apparent that said end portions will wear away less rapidly than the intermediate portions of the cutting edge and, as a result, the bit will not wear down to such an extent as to produce rounded corners. By having the sides 3 parallel the bit will wear away uniformly throughout the width thereof and the cutting edge will be maintained constantly of the same length and contour.

By providing a channel in the front face of the body of the bit, an efficient seat is afforded for the set screw commonly used for securing the bit in the socket of the chain, it having been found that the bit is thus more firmly held than where a flat surface is presented to the set screw.

What is claimed is:—

1. A bit for mining machines including a shank provided with a curved end, the point of which is in advance of the front face of the bit, there being a single longitudinally extending channel in the front face of the bit, said channel being transversely concaved, one end of the channel intersecting the active end of the bit to form a rearwardly bowed cutting edge.

2. A bit for mining machines including a shank provided with a curved end, the point of which is in advance of the front face of the bit, there being a single longitudinally extending channel in the front face of the bit and one end of which intersects the active end of the bit to form a cutting edge, the opposed portions of which diverge forwardly, those portions of the point between said intersecting portion of the channel and the sides of the bit being straight and in alinement.

In testimony that I claim the foregoing as my own, I have hereto affixed my signature in the presence of two witnesses.

JUSTUS J. MOORE.

Witnesses:
SELINA WILLSON,
KATHERINE PEACOCK.

Copies of this patent may be obtained for five cents each, by addressing the "Commissioner of Patents, Washington, D. C."